US012220794B2

(12) United States Patent
Huang

(10) Patent No.: US 12,220,794 B2
(45) Date of Patent: Feb. 11, 2025

(54) FRICTION RING PLIER

(71) Applicant: Jackco Transnational Inc., Azusa, CA (US)

(72) Inventor: John Huang, Azusa, CA (US)

(73) Assignee: Jackco Transnational Inc., Azusa, CA (US)

( * ) Notice: Subject to any disclaimer, the term of this patent is extended or adjusted under 35 U.S.C. 154(b) by 0 days.

(21) Appl. No.: 17/975,188

(22) Filed: Oct. 27, 2022

(65) Prior Publication Data

US 2023/0137156 A1 May 4, 2023

Related U.S. Application Data

(60) Provisional application No. 63/273,011, filed on Oct. 28, 2021.

(51) Int. Cl.
*B25B 27/20* (2006.01)

(52) U.S. Cl.
CPC .................................. *B25B 27/205* (2013.01)

(58) Field of Classification Search
CPC .... B25B 7/00; B25B 7/02; B25B 7/06; B25B 7/18; B25B 27/14; B25B 27/20; B25B 27/205; Y10T 29/53604; Y10T 29/5363
See application file for complete search history.

(56) References Cited

U.S. PATENT DOCUMENTS

| | | | | | |
|---|---|---|---|---|---|
| 753,456 | A * | 3/1904 | Weidinger | B25B 7/02 | 81/186 |
| 1,810,631 | A * | 6/1931 | Trump | A01K 35/00 | 81/302 |
| 5,542,167 | A * | 8/1996 | Nakamoto | B25B 7/04 | 81/424 |
| 7,032,479 | B1 * | 4/2006 | Wang | B25B 7/02 | 29/229 |
| 7,210,378 | B1 | 5/2007 | Bibi | | |
| 7,448,301 | B1 * | 11/2008 | Cronin | B25B 27/205 | 7/128 |
| 8,438,715 | B1 * | 5/2013 | Cronin | B23P 19/084 | 29/451 |
| 9,156,150 | B2 | 10/2015 | Wang | | |
| 9,808,052 | B1 * | 11/2017 | Mouzakis, III | B25B 7/12 | |
| 2015/0298310 | A1 | 10/2015 | Cronin | | |

* cited by examiner

*Primary Examiner* — Robert J Scruggs
(74) *Attorney, Agent, or Firm* — Schwegman Lundberg & Woessner, P.A.

(57) ABSTRACT

A plier tool for expanding a friction ring having a first opposing end and a second opposing end can include a first arm including a distal portion comprising a first protrusion extending distally from a central axis and a first projection extending outwardly from the first protrusion away from the central axis, the first projection configured to engage the first opposing end of the friction ring; and a second arm including a distal portion comprising a second protrusion extending distally from the central axis and a second projection extending outwardly from the second protrusion away from the central axis, the second projection configured to engage the second opposing end of the friction ring.

21 Claims, 4 Drawing Sheets

FIG. 4

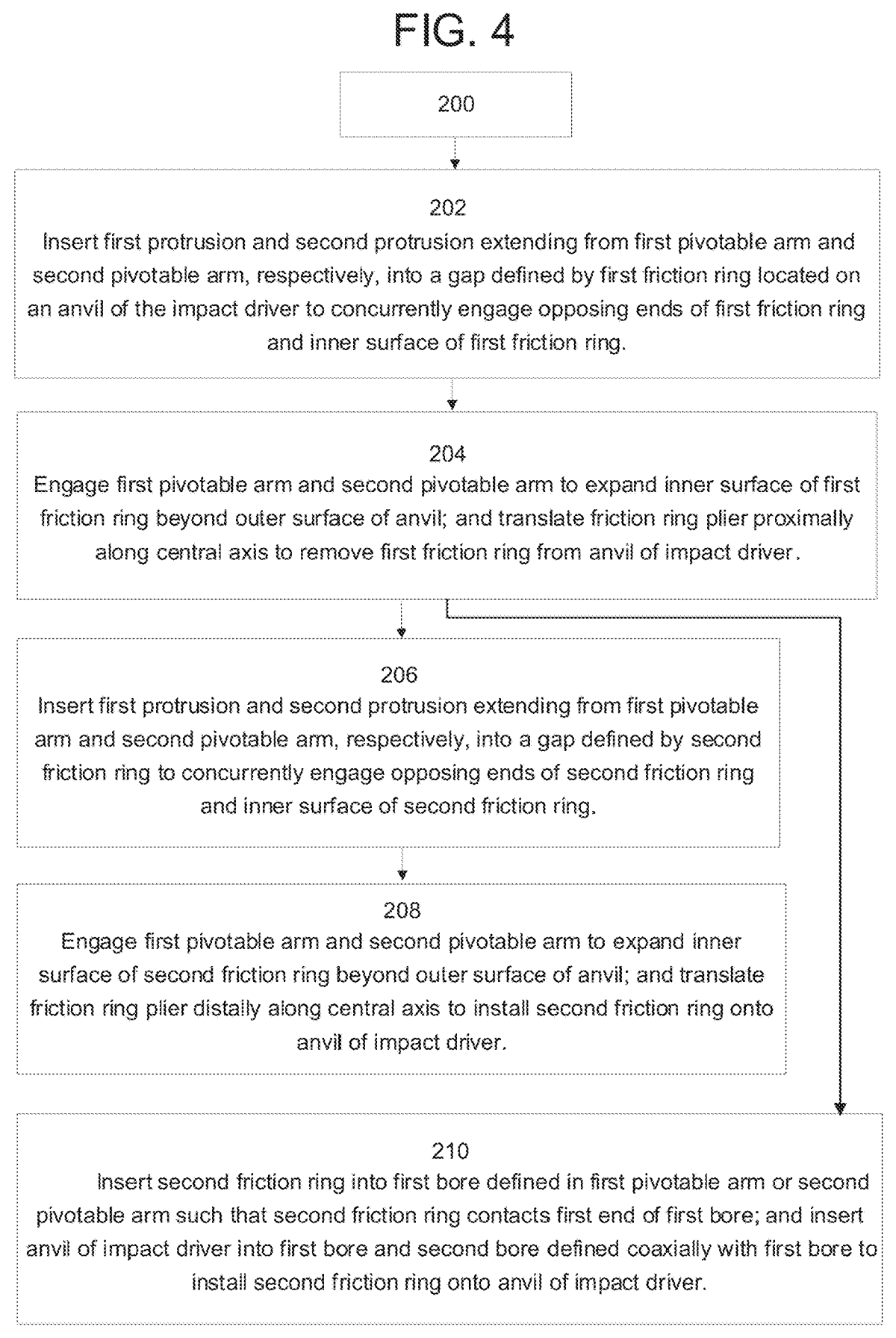

200

202
Insert first protrusion and second protrusion extending from first pivotable arm and second pivotable arm, respectively, into a gap defined by first friction ring located on an anvil of the impact driver to concurrently engage opposing ends of first friction ring and inner surface of first friction ring.

204
Engage first pivotable arm and second pivotable arm to expand inner surface of first friction ring beyond outer surface of anvil; and translate friction ring plier proximally along central axis to remove first friction ring from anvil of impact driver.

206
Insert first protrusion and second protrusion extending from first pivotable arm and second pivotable arm, respectively, into a gap defined by second friction ring to concurrently engage opposing ends of second friction ring and inner surface of second friction ring.

208
Engage first pivotable arm and second pivotable arm to expand inner surface of second friction ring beyond outer surface of anvil; and translate friction ring plier distally along central axis to install second friction ring onto anvil of impact driver.

210
Insert second friction ring into first bore defined in first pivotable arm or second pivotable arm such that second friction ring contacts first end of first bore; and insert anvil of impact driver into first bore and second bore defined coaxially with first bore to install second friction ring onto anvil of impact driver.

FRICTION RING PLIER

CROSS-REFERENCE TO RELATED APPLICATION

This application claims priority to U.S. Provisional Patent Application Ser. No. 63/273,011, filed on Oct. 28, 2021, which is incorporated by reference herein in its entirety.

FIELD OF THE INVENTION

The present subject matter relates generally to plier tools such as split ring or snap ring pliers.

BACKGROUND

Split rings (also called snap rings, retaining rings, or friction rings) are circular retaining elements usable to limit translation of various mechanical elements such as bearings, gears, pulleys, sockets relative to a shaft. For example, a friction ring can engage an annular groove formed in an anvil of an impact driver, such to inhibit axial translation by engaging a removable socket at least partially encompassing the anvil. In such an example, the friction ring can be replaced by a user by first engaging, and then expanding, the friction ring with a ring plier until an internal diameter of the friction ring is greater than a diameter of the anvil to thereby enable the friction ring to be axially translated relative to the anvil. Friction rings of a variety of tools or equipment can be replaced using a similar method.

Various types of ring pliers may be used to replace split rings of various tools, equipment, or machinery. For example, ring pliers may be used to replace a friction ring located on an anvil of impact driver. Such ring pliers may include a pair of pivotably coupled arms each defining a handle at a proximal end of each arm and a protrusion extending beyond a distal end of each arm. The protrusions extending from the arms are configured to engage opposing ends of the friction ring by extending into a gap or split in the friction ring. For example, when the protrusions of the pair of arms are positioned within the gap or split in the friction ring, a user can squeeze (e.g., move inwardly or toward each other) the handles of the pair of arms to cause the protrusions to move away from each other, thereby expanding a diameter of the friction ring, such as beyond a diameter of an anvil of an impact driver.

The user may maintain inward force on the handles of the arms and move the pliers to install the friction ring onto the anvil of the impact driver, or move the ring pliers to remove the friction ring from the anvil of the impact driver. However, currently available ring pliers have a pair of arms that can often slip off or otherwise disengage the opposing ends of the friction ring during removal or installation of the friction ring. This is especially problematic should the friction ring contact the anvil of the impact driver during installation or removal and may result in several time-consuming installation or removal attempts for the user as the friction ring either is launched from the arms during installation or slips off the arms and back onto the anvil for removal. Additionally, friction rings can possess a significant amount of stored elastic energy when in an expanded state, which can cause the friction ring fly off the protrusions and pose a danger to the user or those about the user during the installation or removal process.

After the friction ring has been removed from the anvil using the ring plier, a user can alternatively utilize an anvil block instead of the ring plier to install a replacement friction ring. In general, an anvil block is a body defining a first bore configured to receive a replacement friction ring and a second co-axial bore extending deeper into the handle, relative to the first bore, and configured to receive a portion of the anvil of the impact driver about which the friction ring is to be received thereon. For example, when a friction ring is located within the first bore, a user can insert a portion of the anvil of the impact driver axially through the friction ring and into the second bore, such that the friction ring is expanded by the anvil moving therethrough, until the friction ring is received within an annular groove defined by the anvil. However, such anvil blocks are separate from the pliers and must be located for installation. In view of the above issues, an improved ring plier is desirable.

BRIEF DESCRIPTION OF THE DRAWINGS

In the drawings, which are not necessarily drawn to scale, like numerals may describe similar components in different views.

FIG. 4 illustrates a flowchart of a method of replacing a friction ring of an impact driver using a friction ring plier, in accordance with one embodiment of the present application.

DETAILED DESCRIPTION

The following description and the drawings sufficiently illustrate specific examples to enable those skilled in the art to practice them. Other examples may incorporate structural, process, or other changes without departing from the scope of the present subject matter.

The present disclosure addresses the issues described herein, and others as known to a person of skill in the art. In various embodiments, the present subject matter provides a friction ring plier capable of engaging opposing ends of a friction ring to prevent disengagement of it from the friction ring plier during installation or removal of the friction ring. For example, in various embodiments, the friction ring plier includes a pair of protrusions extending outwardly from a central axis of a pair of arms. The protrusions are positioned within a gap or split of a friction ring to engage opposing ends of the friction ring, thereby expanding the friction ring for installation or removal of the friction ring. In various embodiments, the projections engage an inner surface of the friction ring so as to limit expansion of the friction ring with respect to the protrusions. This allows the split ring to be enlarged without undue force on the split ring for the sake of removal or installation of the split ring.

The projections prevent the friction ring from slipping off a distal end of the protrusions during installation or removal (e.g., during proximal or distal translation of the friction ring plier), such as to improve the ease with which a user can replace a friction ring located on an anvil of an impact driver. Further, in various embodiments, a handle of the friction ring plier can include an anvil block. For example, a handle of a first arm or a second arm of the friction ring plier can define a first bore configured to receive and retain a replacement friction ring therein, and a second co-axial bore configured to receive a portion of the anvil of the impact driver. The handles conveniently expand and retain a replacement friction ring and improve the ease with which a user can install a replacement friction ring onto an anvil of an impact driver.

Figure 1:
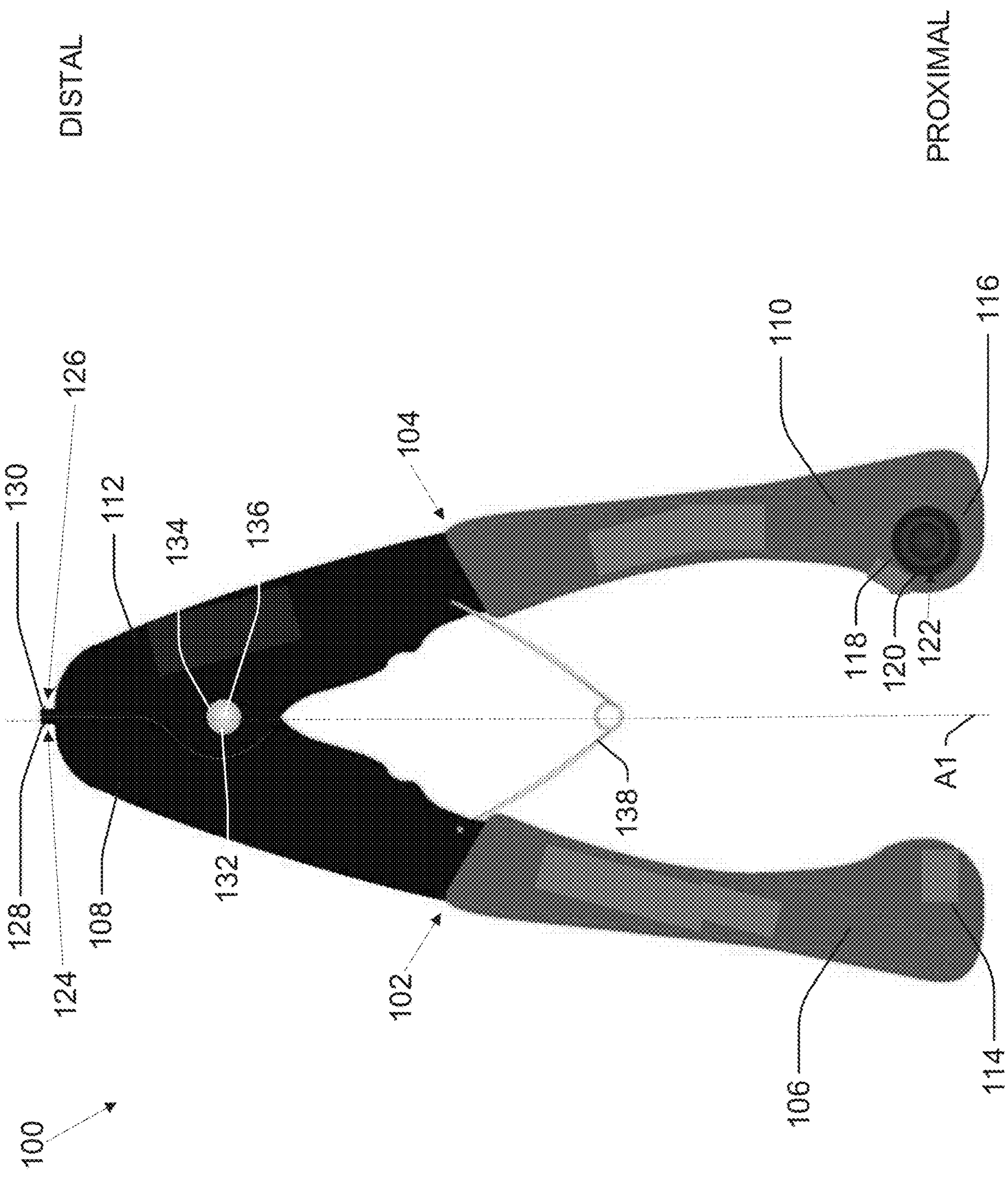
FIG. 1 illustrates an isometric view of a friction ring plier, in accordance with one embodiment of the present application.

FIG. 1 illustrates an isometric view of a friction ring plier 100, in accordance with one embodiment of the present application. Also shown in FIG. 1 is a central axis A1, and orientation indicators "proximal" and "distal." In the demonstrated exemplary embodiment, friction ring plier 100 includes a first arm 102 and a second arm 104. The first arm 102 can include a proximal portion 106 and a distal portion 108, and the second arm 104 can include a proximal portion 110 and a distal portion 112. The proximal portion 106 of the first arm 102 and the proximal portion 110 of the second arm 104 each include a first handle 114 and a second handle 116, respectively. The first handle 114 and the second handle 116 can be configured to receive and encompass at least a segment of the proximal portion 106 of the first arm 102 and proximal portion 110 of the second arm, respectively.

In various embodiments, the second handle 116 of the second arm 104 define a first bore 118 and a second bore 120. In various embodiments, the first bore 118 is configured to receive a friction ring 122 therein. For example, the first bore 118 may be configured to contact an outer surface of the friction ring 122, such that the friction ring 122 is press-fit into the first bore 118. The second bore 120 can be defined coaxially with the first bore 118 of the second handle 116 and can be configured to receive at least a portion of an anvil of an impact driver, such as by extending deeper into the second handle 116 relative to the first bore 118. In various embodiments, the first handle 114 of the first arm 102 may define the first bore 118 and the second bore 120. In still further embodiments, the first and second bore are attached to a handle in the form of a polymeric, hard rubber, metal, or plastic device attachable to either handle.

The distal portion 108 of the first arm 102 includes a first protrusion 124 and the distal portion 112 of the second arm 104 includes a second protrusion 126. The first protrusion 124 and the second protrusion 126 extend axially distally from the distal portion 108 of the first arm 102 and the distal portion 112 of the second arm 104, respectively, such as parallel to and laterally offset from the central axis A1. The first protrusion 124 may include a first projection 128 and the second protrusion 126 may include a second projection 130. In various embodiments, the first projection 128 extends away from a portion of the first protrusion 124, and the second projection 130 extends away from a portion of the second projection 130, relative to the central axis A1, and each protrusion extend away from each other to better engage a friction ring. The first protrusion 124 and the first projection 128, and the second protrusion 126 and the second projection 130, are configured to collectively engage a friction ring, such as the friction ring 122.

The first arm 102 is pivotably coupled or otherwise pivotably connected to the second arm 104. For example, the first arm 102 can define a first pivot bore 132 and the second arm 104 can define a second pivot bore 134. Each of the first pivot bore 132 and the second pivot bore 134 can be configured to contact and receive a fastener 136, such that the first arm 102 is pivotable relative to the second arm 104 and to the central axis A1. The fastener 136 can be, for example, but not limited to, any of a rivet, screw, bolt, or another type of fastener. The fastener 136 can inserted into the first pivot bore 132 and the second pivot bore 134, such as the fastener 136 extends transversely through the distal portion 108 of the first arm 102 and the distal portion 112 of the second arm 104. The fastener 136 can thereby form a pivot point and pivot axis of the friction ring plier 100.

In various embodiments, the friction ring plier 100 includes a biasing feature 138. The biasing feature 138 may be, for example, but not limited to, a leaf or coil spring. The biasing feature 138 can be located between, and be coupled to, the first arm 102 and the second arm 104. The biasing feature 138 can be coupled to the first arm 102 and the second arm 104 in various locations, such as generally between the proximal portion 106 and the distal portion 108, and generally between the proximal portion 110 and the distal portion 112. In various embodiments, the biasing feature 138 can be configured to bias the distal portion 108 of the first arm 102 toward the distal portion 112 of the second arm 104 or to bias the distal portion 108 of the first arm 102 away from the distal portion 112 of the second arm 104.

In the operation of various embodiments, a user can remove the friction ring 122 (FIG. 2) from an anvil 144 (FIG. 2) of an impact driver 146 (FIG. 2) with the friction ring plier 100. The user can insert the first protrusion 124 and the second protrusion 126 into a gap 140 (FIG. 2) defined by the friction ring 122, such as by translating the friction ring plier 100 distally along the central axis A1 until a distal surface 152 (FIG. 2) of the first protrusion 124 and a distal surface 158 (FIG. 2) of the second protrusion 126 contacts an outer surface 147 (FIG. 2) of the anvil 144. The user can then engage the first handle 114 and the second handle 116 (e.g., move inwardly or toward each other and the central axis A1) to cause the first protrusion 124 and the second protrusion 126 to move away from each other and the central axis A1, thereby expanding the friction ring 122 by moving opposing ends 142 (FIG. 2) of the friction ring 122 defining the gap 140 away from each other and the central axis A1, to increase a diameter of the inner surface 143 of the friction ring 122 beyond a dimension of an outer surface 147 (FIG. 2) of the anvil 144.

During such engagement, the opposing ends 142 of the friction ring 122 can be in contact with the first protrusion 124 and the second protrusion 126 to expand the friction ring 122, and the inner surface 143 (FIG. 2) of the friction ring 122 can be in contact with the first projection 128 and the second projection 130 to prevent distal translation of the friction ring 122 relative to the first protrusion 124 and the second protrusion 126. A user can finally remove the friction ring 122 from within an annular groove 148 (FIG. 2) defined by the anvil 144 (FIG. 2) via proximal translation of the friction ring pliers 100, while maintaining inward pressure on the first handle 114 and the second handle 116 to maintain the friction ring 122 in an expanded state.

A user can further install the friction ring 122 onto the anvil 144 of the impact driver 146 using a similar method, such as by repeating the above steps, but translating the friction ring plier 100 distally, rather than proximally, while maintaining inward pressure on the first handle 114 and the second handle 116 to maintain the friction ring 122 in an expanded state. In the operation of various embodiments, a user can alternatively install the friction ring 122 onto the anvil 144 of the impact driver 146 using the first bore 118 and the second bore 120, such as defined in the second handle 116. For example, when the friction ring 122 is located and retained within the first bore 118, a user can insert a portion of the anvil 144 axially through the friction ring 122 located within the first bore 118 to contact and expand the inner surface 143 of the friction ring 122 with the outer surface 147 (FIG. 2) of the anvil 144. The user can then continue to translate the anvil 144 through the friction ring 122 into the second bore 120, such as until a distal surface of the anvil 144 contacts an end of the second bore 120 to align the friction ring 122 with the annular groove 148 defined by the anvil 144, to cause the inner surface 143 of the friction ring 122 to become received within the annular groove 148.

Figure 2:
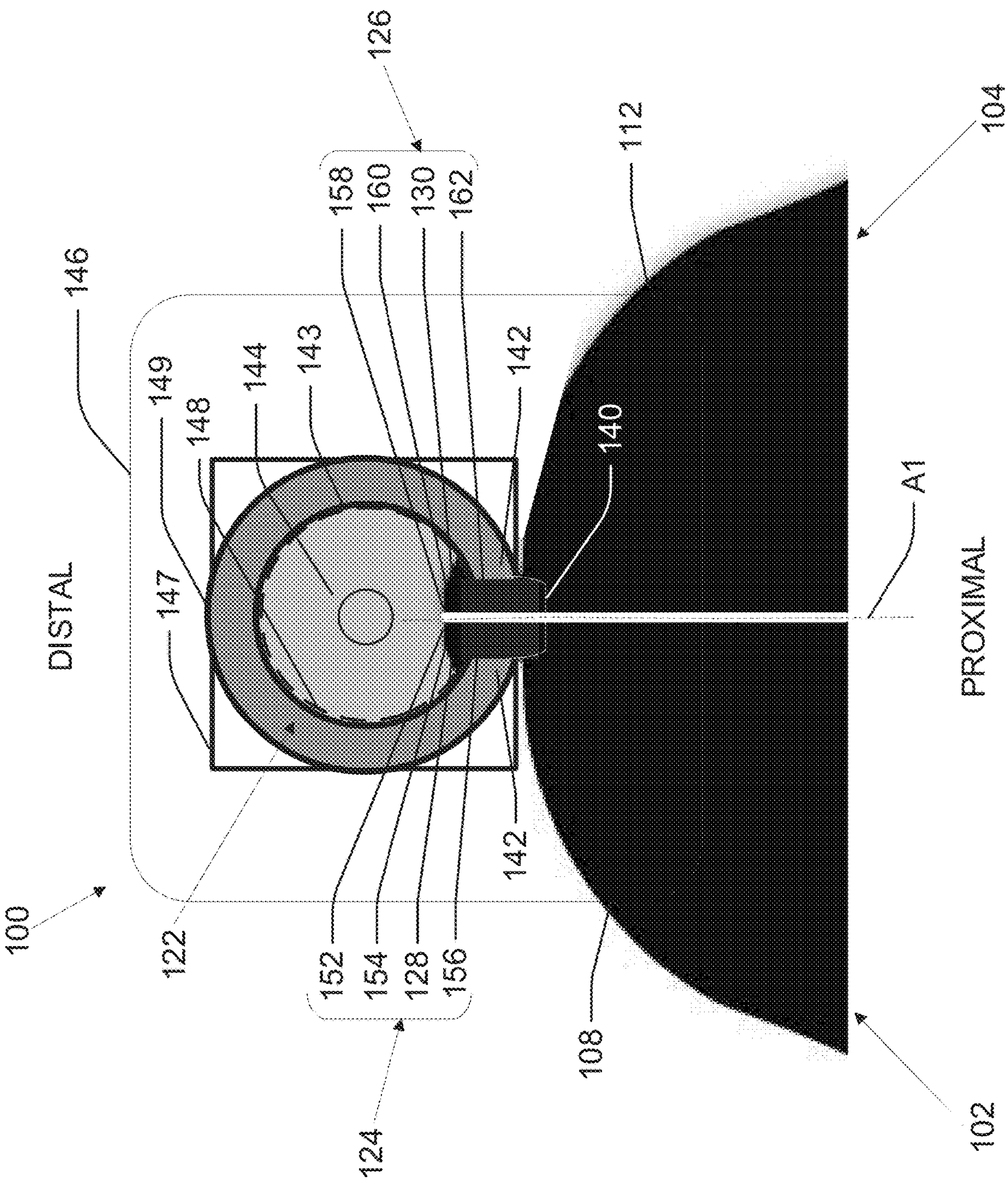
FIG. 2 illustrates an isometric view of the friction ring plier of FIG. 1 engaging a friction ring of an impact driver.

FIG. 2 illustrates an isometric view of the friction ring plier 100 of FIG. 1 engaging a friction ring 122 of an impact driver 146. Also shown in FIG. 2 is the central axis A1, and orientation indicators Proximal and Distal. The friction ring 122 can include an outer surface 149. When the friction ring 122 installed on the anvil 144, the inner surface 143 can be received within the annular groove 148 (shown in shadow in FIG. 2) defined by the anvil 144, and the outer surface 147 can extend outwardly beyond the outer surface 147 of the anvil 144, such as to engage and retain a removable socket configured to be positionable on and encompass anvil 144. In various embodiments, the inner surface 143 of the friction ring 122 can define a diameter measuring about, but not limited to, 0.2-0.4 inches, 0.5-0.7 inches, or 0.8-1.0 inches. In various embodiments, the inner surface 143 of the friction ring 122 can define a diameter measuring 0.375 inches, 0.5 inches, 0.75 inches, or 1.0 inches.

The first protrusion 124 can include the first projection 128, a distal surface 152, an angled surface 154, and an outer surface 156. Similarly, the second protrusion 126 can include the second projection 130, a distal surface 158, an angled surface 160, and an outer surface 162. The first protrusion 124 and the second protrusion 126, such as including the first projection 128, the distal surface 152, the angled surface 154, the outer surface 156, the distal surface 158, the angled surface 160, or the outer surface 162, or any portion or combination thereof, can individually or collectively form various three-dimensional shapes, such as, but not limited to, a cylinder or a semi-cylindrical shape, an ellipse or an ellipsoidal or semi-ellipsoidal shape, or a triangular, rectangular, hexagonal, or octagonal prism.

The first protrusion 124 and the second protrusion 126 can extend from the first arm 102 and the second arm 104, respectively, by various linear distances, such as defined as the distance between the distal surface 152 and the distal surface 158, and the distal portion 108 and the distal portion 112, respectively, relative to the central axis A1. Such a linear distance can be configured, for example, based on a linear distance defined between the inner surface 143 and the outer surface 149 of the friction ring 122, such as to help enable the first projection 128 and the second projection 130 to contact the inner surface 143 of the friction ring 122. The linear distance between the distal surface 152 and the distal portion 108, and the linear distance between the distal surface 158 and distal portion 112, can be about, but not limited to, 1-1.5 millimeters, 1.6-2.0 millimeters, 2.1-2.5 millimeters, or 2.6-3.0 millimeters. In various embodiments, the linear distance between the distal surface 152 and the distal portion 108, and the linear distance between the distal surface 158 and distal portion 112, can be about 2.1 or 2.5 millimeters. In various embodiments, the linear distance between the distal surface 152 and the distal portion 108, and the linear distance between the distal surface 158 and distal portion 112, can be similar or different relative to each other.

The first projection 128 can extend laterally outward from the first protrusion 124, such as from any of various locations between the distal surface 152 and the distal portion 108 of the first arm 102, and the second projection 130 can extend laterally outward from the second protrusion 126, such as from any of various location between the distal surface 158 and the distal portion 112 of the second arm 104. The first projection 128 can extend laterally outward beyond the outer surface 156 of the first protrusion 124, and the second projection 130 can extend laterally outward beyond the outer surface 162 of the second protrusion 126, respectively, by any of various linear distances. Such a linear distance can be configured based on, for example, a linear distance defined by the gap 140 of the friction ring 122, such as measured between the opposing ends 142, such as to help enable the first projection 128 and the second projection 130 pass through the gap 140 to the inner surface 143 of the friction ring 122.

The first projection 128 can extend laterally outward beyond the outer surface 156 of the first protrusion 124, and the second projection 130 can extend laterally outward beyond the outer surface 162 of the second protrusion 126, by about, but not limited to, 0.05-0.10 millimeters, 0.11-0.15 millimeters, 0.16-0.20 millimeters, or 0.21-0.25 millimeters. In various embodiments, the first projection 128 can extend laterally outward beyond the outer surface 156 of the first protrusion 124, and the second projection 130 can extend laterally outward beyond the outer surface 162 of the second protrusion 126 by 0.15 millimeters or 0.17 millimeters. The first projection 128 can extend laterally outward beyond the outer surface 156 of the first protrusion 124, and the second projection 130 can extend laterally outward beyond the outer surface 162 of the second protrusion 126 by a linear distance that is similar or different relative to each other. The first projection 128 and the second projection 130 can also extend laterally outward beyond the outer surface 156 and the outer surface 162, respectively, at similar or at different angles relative to each other and to the central axis A1.

In various embodiments, the outer surface 156 of the first protrusion 124 and the outer surface 162 of the second protrusion 126 can extend axially distally from the distal portion 108 of the first arm 102 and the distal portion 112 of the second arm 104, respectively, such by extending parallel to and laterally offset from the central axis A1 by various linear distances. Such a linear distance can be configured based on, for example, a linear distance defined between the inner surface 143 and the outer surface 149 of the friction ring 122, such as to help enable the first projection 128 and the second projection 130 to contact the inner surface 143 of the friction ring 122. In various embodiments, the outer surface 156 of the first protrusion 124 and the outer surface 162 of the second protrusion 126 can also extend at other angles relative to the central axis A1, such as at about, but not limited to, 50-60 degrees, 61-70 degrees, 71-80, degrees, 81-90 degrees, 91-100 degrees, 101-110 degrees, or 111-120 degrees.

The angled surface 154 of the first protrusion 124 can be a surface of the first protrusion 124 extending between the distal surface 152 and the outer surface 156, and the angled surface 160 of the can be a surface of the second protrusion 126 extending between the distal surface 158 of the outer surface 162. The angled surface 154 and the angled surface 160 can extend at various angled relative to the central axis A1, such as at about, but not limited to, 1-20 degrees, 21-40 degrees, 41-60 degrees, 61-80 degrees, or 81-90 degrees. In various embodiments, the angled surface 154 and the angled surface 160 can formed a beveled, chamfered, concave, or convex shape, or any combination thereof, such as configured to help facilitate the insertion of the first protrusion 124 and the second protrusion 126 into the gap 140 of the friction ring 122 by contacting the opposing ends 142 thereof during insertion. In various embodiments, any component of the friction ring plier 100 such as including the first arm 102, the second arm 104, the first protrusion 124, and the second protrusion 126, can be made from various materials such as, but not limited to, metals, plastics, composites, or other materials, or a combination thereof.

When the first protrusion 124 and the second protrusion 126 are inserted into the gap 140 defined by the friction ring 122, the first projection 128 and the second projection 130 can concurrently contact the inner surface 143 of the friction ring 122, and the outer surface 156 of the first protrusion 124 and the outer surface 162 of the second protrusion 126 can concurrently contact the opposing ends 142 of the friction ring 122. The opposing ends 142 can generally be opposing surfaces and can include a first end or a first surface and a second end or a second surface. In view of the above, the friction ring plier 100 can thereby engage the friction ring 122 along two axes concurrently, such as by both expanding the friction ring 122 via the outer surface 156 and the outer surface 162, and preventing distal translation and disengagement of the friction ring 122 from the friction ring plier 100 via the first projection 128 and the second projection 130 during installation or removal (e.g., distal or proximal translation of the friction ring plier 100) of the friction ring 122 from the anvil 144 of the impact driver 146.

Figure 3B:
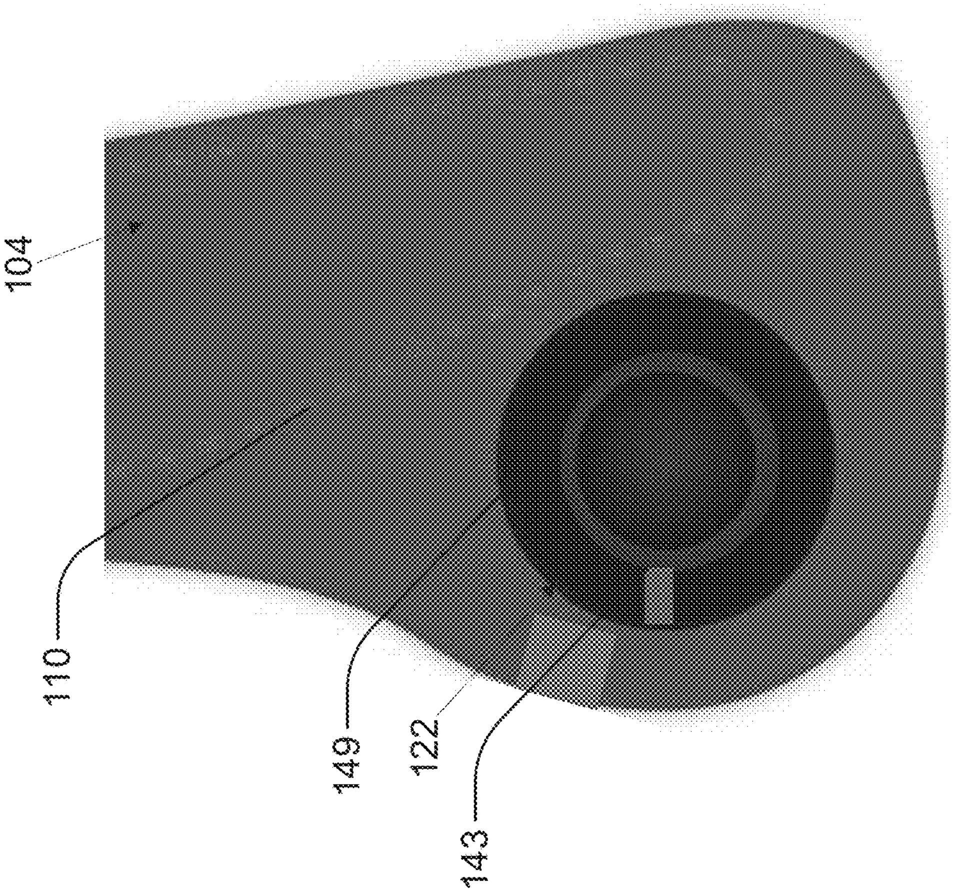
FIG. 3B illustrates an isometric view of a second handle of the friction ring plier of FIG. 1 with a friction ring received therein.
Figure 3A:
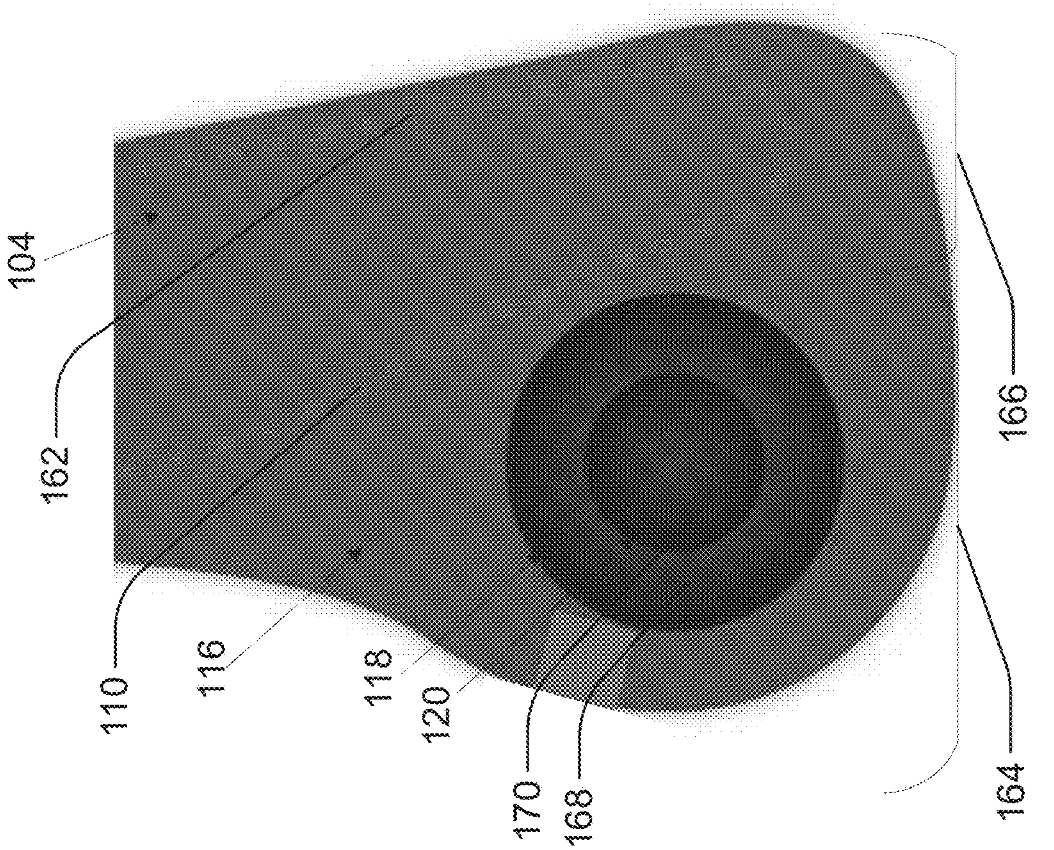
FIG. 3A illustrates an isometric view of a second handle of the friction ring plier of FIG. 1 with a friction ring removed therefrom.

FIG. 3A illustrates an isometric view of a second handle 116 of the friction ring plier 100 of FIG. 1 with a friction ring 122 removed therefrom. FIG. 3B illustrates an isometric view of a second handle 116 of the friction ring plier 100 of FIG. 1 with a friction ring 122 received therein. FIGS. 3A-3B are discussed below concurrently. For brevity, the following description discusses various aspects and features of the friction ring plier 100 with reference to the second handle 116 of the second arm 104 (shown in shadow in FIGS. 3A-3B), but the first handle 114 (FIG. 1) of the first arm 102 (FIG. 1) can also include any of the following aspects or features.

The second handle 116 can include an inner portion 164 and an outer portion 166. The outer portion 166 can generally be a portion of the second handle 116 configured to receive and encompass the proximal portion 106 of the first arm 102 and the proximal portion 110 of the second arm 104. The inner portion 164 can generally be a portion of the second handle 116 extending inwardly, such as toward the central axis A1 (FIG. 1) from the outer portion 166. The inner portion 164 and the outer portion 166 can individually or collectively form various three-dimensional shapes. For example, the inner portion 164 or various portions thereof, such as front surface or a back surface, can form a generally circular or semi-circular, ellipsoidal or semi-ellipsoidal, or rectangular shape. The outer portion 166 can form a generally elongated or flattened shape, such as similar or generally conforming to a shape, or shapes defined by, various portions of the second arm 104. As discussed with regard to FIG. 1 above, the second handle 116 can define a first bore 118 and a second bore 120. The first bore 118 and the second bore 120 can extend at least partially through a depth or height of the inner portion 164 of the handle 116, such as orthogonally or otherwise transversely relative to the central axis A1 (FIG. 1).

The first bore 118 can be configured to receive the friction ring 122. For example, the first bore 118 can be configured to contact and engage the outer surface 149 of the friction ring 122, such as to retain or store the friction ring 122 therein. As such, the first bore 118 can define a diameter corresponding to, or otherwise based on, a diameter defined by the outer surface 149 of the friction ring 122. For example, the first bore 118 can define a diameter of about, but not limited to, 0.2-0.5 inches, 0.5-0.7 inches, or 0.7-1.0 inches, and the outer surface 149 of the friction ring 122 can define a diameter of about, but not limited to, 0.19-0.49 inches, 0.49-0.69 inches, or 0.69-0.99 inches, respectively. In one embodiment, the first bore 118 can define a diameter of about 0.52 inches and the outer surface 149 of the friction ring 122 can define a diameter of about 0.51 inches. The second bore 120 can be configured to receive the anvil 144 (FIG. 2) of the impact driver 146 (FIG. 2) therein. For example, the second bore 120 can be configured to contact and engage at least a portion of the outer surface 147 (FIG. 2) of the anvil 144.

The first bore 118 can define a first end 168 and the second bore 120 can define a second end 170. The second end 170 of the second bore 120 can be defined at a greater linear distance within the second handle 116 relative to the first end 168 of the first bore 118, such as to allow the anvil 144 (FIG. 2) to extend axially through the friction ring 122 to contact and expand the inner surface 143 of the friction ring 122 when inserted into and at least partially located within the second bore 120. For example, the first end 168 can be configured to support the friction ring 122 at a depth within the second handle 116 configured to align the annular groove 148 (FIG. 2) of the anvil 144 with the inner surface 143 of the friction ring 122, such as to help enable a user to install the friction ring 122 thereon or thereinto by inserting the anvil 144 through the first bore 118 and the friction ring 122 to contact the second end 170 of the second bore 120 with a distal surface of the anvil 144.

The second handle 116, and any features or components thereof, can be made from various materials, such as, but not limited to, rubber, plastic, metals, composites, other materials, or a combination thereof. For example, the second handle 116 can be made from an elastically deformable material, such as to help allow the inner surface 143 and the outer surface 149 of the friction ring 122 expand within the first bore 118 during insertion of the anvil 144 through the friction ring 122. In various embodiments, the second handle 116 can be a handle portion of any currently available pivotable split ring pliers or other plier tools, such as configured to receive an arm of any currently available pivotable split ring pliers or other plier tools to enable such split ring pliers or other tools to receive and retain a replacement split ring therein.

FIG. 4 illustrates a flowchart of a method of replacing a friction ring of an impact driver using a friction ring plier, in accordance with one embodiment of the present application. The steps or operations of the method 200 are illustrated in a particular order for convenience and clarity. The discussed operations can be performed in parallel or in a different sequence without materially impacting other operations. The method 200 as discussed includes operations that can be performed by multiple different actors, devices, and/or systems. It is understood that subsets of the operations discussed in the method 200 can be attributable to a single actor device, or system, and could be considered a separate standalone process or method.

The method 200 can include operation 202. The operation 202 can include inserting a first protrusion and a second protrusion extending from a first pivotable arm and a second pivotable arm, respectively, into a gap defined by a first friction ring located on an anvil of the impact driver to concurrently engage opposing ends of the first friction ring and an inner surface of the first friction ring. For example, a friction ring can be a split ring including opposing ends defining a gap extending between an inner surface and an outer surface of the friction ring. A user can position the friction ring plier such that the opposing ends of the friction ring are in contact with an outer surface of each of the first protrusion and the second protrusion. When the opposing ends of the friction ring are in contact with an outer surface of each of the first protrusion and the second protrusion, a distal surface of each of the first protrusion and the second protrusion can contact the anvil of the impact driver, and the first projection and the second projection can extend outwardly beyond an outer surface of the first protrusion and the second protrusion to contact an inner surface of the friction ring. The friction ring plier can thereby retain the friction ring along at least two axes during expansion of the inner surface of the friction ring beyond an outer surface of the anvil via translation of the first protrusion away from the second protrusion.

The operation 200 can include operation 204. The operation 204 can include engaging the first pivotable arm and the second pivotable arm to expand the inner surface of the first friction ring beyond an outer surface of the anvil; and translating the friction ring plier proximally along the central axis to remove the first friction ring from the anvil of the impact driver. For example, a user can translate the friction ring plier toward themselves, such as proximally along a central axis, while concurrently engaging the first arm and the second arm to maintain inward pressure on a first handle of the first arm and a second handle of the second arm to maintain a friction ring in an expanded state. The friction ring plier can thereby retain a friction ring along at least two axes during removal of the friction ring from the anvil of the impact driver.

The operation 200 can include operation 206. The operation 206 can include inserting a first protrusion and a second protrusion extending from a first pivotable arm and a second pivotable arm, respectively, into a gap defined by a second friction ring to concurrently engage opposing ends of the second friction ring and an inner surface of the second friction ring, wherein inserting includes translating the friction ring plier distally along the central axis. For example, a friction ring can be a split ring including opposing ends defining a gap extending between an inner surface and an outer surface of the friction ring. A user can position the friction ring plier such that the opposing ends of the friction ring are in contact with an outer surface of each of the first protrusion and the second protrusion. When the opposing ends of the friction ring are in contact with an outer surface of each of the first protrusion and the second protrusion, the first projection and the second projection can extend outwardly beyond an outer surface of the first protrusion and the second protrusion to contact an inner surface of the friction ring. The friction ring plier can thereby retain the friction ring along at least two axes during expansion of the inner surface of the friction ring beyond an outer surface of the anvil via translation of the first protrusion away from the second protrusion.

The operation can include operation 208. The operation 208 can include engaging the first pivotable arm and the second pivotable arm to expand the inner surface of the second friction ring beyond an outer surface of the anvil; and translating the friction ring plier distally along the central axis to install the second friction ring onto the anvil of the impact driver. The method 200 can include operation 208. The operation 208 can include translating the friction ring plier distally along the central axis to install the second friction ring onto the anvil of the impact driver. For example, a user can translate the friction ring plier away from themselves, such as distally along the central axis, while concurrently engaging the first arm and the second arm to maintain inward pressure on a first handle of the first arm and a second handle of the second arm, until the friction ring is aligned and received within an annular groove defined by the anvil. The friction ring plier can thereby retain the friction ring along at least two axes during installation of the friction ring onto the anvil of the impact driver.

The method 200 can include operation 210. The operation 210 can include inserting a second friction ring into a first bore defined in the first pivotable arm or the second pivotable arm such that the second friction ring contacts a first end of the first bore; and inserting the anvil of the impact driver into the first bore and a second bore defined coaxially with the first bore to install the second friction ring onto the anvil of the impact driver. For example, the first end of the first bore can be configured to support the friction ring at a depth within the handle configured to align an annular groove of the anvil with the inner surface of the friction ring to install the friction ring thereon or thereinto when the anvil is inserted through the first bore and the friction ring such that distal surface of the anvil contacts the second end of the second bore.

The above detailed description includes references to the accompanying drawings, which form a part of the detailed description. The drawings show, by way of illustration, specific embodiments in which the invention can be practiced. These embodiments are also referred to herein as "examples." In this document, the terms "a" or "an" are used, as is common in patent documents, to include one or more than one, independent of any other instances or usages of "at least one" or "one or more." The scope of the invention should be determined with reference to the appended claims, along with the full scope of equivalents to which such claims are entitled.

NOTES AND EXAMPLES

The following, non-limiting examples, detail certain aspects of the present subject matter to solve the challenges and provide the benefits discussed herein, among others.

Example 1 is a plier tool for expanding a friction ring having a first opposing end and a second opposing end, comprising: a first arm including a distal portion comprising a first protrusion extending distally from a central axis and a first projection extending outwardly from the first protrusion away from the central axis, the first projection configured to engage the first opposing end of the friction ring; and a second arm including a distal portion comprising a second protrusion extending distally from the central axis and a second projection extending outwardly from the second protrusion away from the central axis, the second projection configured to engage the second opposing end of the friction ring; wherein the second arm is pivotably connected to the first arm to cause the distal portion of the first arm and the distal portion of the second arm to move away from each other and the central axis so as to expand the friction ring for installation or removal.

In Example 2, the subject matter of Example 1 includes, wherein the first projection and the second projection extend radially outwardly beyond an outer surface of the first protrusion and the second protrusion, respectively, between about 0.10 millimeters and about 0.20 millimeters.

In Example 3, the subject matter of Examples 1-2 includes, wherein the first protrusion includes a first angled surface extending between a distal surface of the first protrusion and the first projection, and the second protrusion includes a second angled surface extending between a distal surface of the second protrusion and the second projection.

In Example 4, the subject matter of Example 3 includes, wherein the first angled surface and the second angled surface each extend at an angle of between about 20 degrees and about 40 degrees relative to the central axis.

In Example 5, the subject matter of Examples 1-4 includes, wherein a distance defined between the distal surface of the first protrusion and the distal portion of the first arm, and a distance defined between a distal surface of the second protrusion and the distal portion of the second arm is between about 2 millimeters and about 3 millimeters.

In Example 6, the subject matter of Examples 1-5 includes, a biasing element extending between the proximal portion of the first arm and the proximal portion of the second arm, the biasing element configured to bias the proximal portion of the first arm away from the proximal portion of the second arm and the central axis.

In Example 7, the subject matter of Examples 1-6 includes, wherein the proximal portion of the first arm and the proximal portion of second arm are each received within and encompassed by first handle and a second handle, respectively.

In Example 8, the subject matter of Example 7 includes, wherein the first handle or the second handle defines a first bore extending at least partially therethrough, and a second bore extending co-axially within the first bore, wherein the first bore is configured to receive a friction ring therein and the second bore is configured to receive at least a portion of an anvil of an impact driver therein.

Example 9 is a plier tool for expanding a friction ring having a first opposing end and a second opposing end, comprising: a first arm including a distal portion comprising a first protrusion extending distally from a central axis and a first projection extending outwardly from the first protrusion away from the central axis, the first projection configured to engage the first opposing end of the friction ring; and a second arm including a distal portion comprising a second protrusion extending distally from the central axis and a second projection extending outwardly from the second protrusion away from the central axis, the second projection configured to engage the second opposing end of the friction ring, the first or the second handle defining a first bore configured to receive the friction ring therein and a second bore configured to receive at least a portion of an anvil of an impact driver therein; wherein the second arm is pivotably connected to the first arm to cause the distal portion of the first arm and the distal portion of the second arm to move away from each other and the central axis so as to expand the split ring for installation or removal.

In Example 10, the subject matter of Example 9 includes, wherein the first protrusion includes a first projection extending radially outwardly beyond an outer surface of the first protrusion orthogonally to the central axis, the first projection configured to engage an inner surface of the friction ring; and wherein the second protrusion includes a second projection extending radially outwardly beyond an outer surface of the second protrusion, the first projection configured to engage an inner surface of the friction ring.

In Example 11, the subject matter of Example 10 includes, wherein the first projection and the second projection extend radially outwardly beyond the outer surface of the first protrusion and the second protrusion, respectively, between about 0.10 millimeters and about 0.20 millimeters.

In Example 12, the subject matter of Examples 10-11 includes, wherein the first protrusion includes a first angled surface extending between a distal surface of the first protrusion and the first projection, and the second protrusion includes a second angled surface extending between a distal surface of the second protrusion and the second projection.

In Example 13, the subject matter of Example 12 includes, wherein the first angled surface and the second angled surface each extend at an angle of between about 20 degrees and about 40 degrees relative to the central axis.

In Example 14, the subject matter of Examples 12-13 includes, wherein a distance defined between the distal surface of the first protrusion and the distal portion of the first arm, and a distance defined between the distal surface of the second protrusion and the distal portion of the second arm is between about 2 millimeters and about 3 millimeters.

In Example 15, the subject matter of Examples 9-14 includes, a biasing element extending between a proximal portion of the first arm and the proximal portion of the second arm, the biasing element configured to bias the proximal portion of the first arm away from the proximal portion of the second arm and the central axis.

In Example 16, the subject matter of Examples 9-15 includes, wherein the first bore includes a first end configured to limit translation of the friction ring within the first bore, and wherein the second bore includes a second end configured to limit translation of the anvil of the impact driver to align an annular groove configured to receive the friction ring therein with the first end of the first bore.

In Example 17, the subject matter of Examples 10-16 includes, wherein the outer surface of the first protrusion and the outer surface of the second protrusion each form a semi-ellipsoidal shape, such that the outer surface of the first protrusion and the outer surface of the second protrusion collectively form an ellipsoidal shape.

Example 18 is a method of replacing a friction ring of an impact driver using a friction ring plier, the method comprising: inserting a first protrusion and a second protrusion extending from a first pivotable arm and a second pivotable arm, respectively, into a gap defined by a first friction ring located on an anvil of the impact driver to concurrently engage opposing ends of the first friction ring and an inner surface of the first friction ring, wherein inserting includes, translating the friction ring plier distally along a central axis; engaging the first pivotable arm and the second pivotable arm to expand the inner surface of the first friction ring beyond an outer surface of the anvil; and translating the friction ring plier proximally along the central axis to remove the first friction ring from the anvil of the impact driver.

In Example 19, the subject matter of Example 18 includes, inserting a first protrusion and a second protrusion extending from a first pivotable arm and a second pivotable arm, respectively, into a gap defined by a second friction ring to concurrently engage opposing ends of the second friction ring and an inner surface of the second friction ring, wherein inserting includes translating the friction ring plier distally along the central axis; engaging the first pivotable arm and the second pivotable arm to expand the inner surface of the second friction ring beyond an outer surface of the anvil; and translating the friction ring plier distally along the central axis to install the second friction ring onto the anvil of the impact driver.

In Example 20, the subject matter of Examples 18-19 includes, inserting a second friction ring into a first bore defined in the first pivotable arm or the second pivotable arm such that the second friction ring contacts a first end of the first bore; and inserting the anvil of the impact driver into the first bore and a second bore defined coaxially with the first bore to install the second friction ring onto the anvil of the impact driver.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A plier tool for expanding a friction ring having a first opposing end and a second opposing end, comprising:

a first arm including a distal portion comprising a first protrusion extending distally from a central axis and a first projection extending outwardly from the first protrusion away from the central axis, the first projection configured to engage the first opposing end of the friction ring; and a second arm including a distal portion comprising a second protrusion extending distally from the central axis and a second projection extending outwardly from the second protrusion away from the central axis, the second projection configured to engage the second opposing end of the friction ring;

wherein the second arm is pivotably connected to the first arm to cause the distal portion of the first arm and the distal portion of the second arm to move away from each other and the central axis so as to expand the friction ring for installation or removal, and wherein the first protrusion and the second protrusion each include a distal surface coplanar with each other, wherein the first protrusion includes a first angled surface extending between the distal surface of the first protrusion and an outermost tip of the first projection, and wherein the second protrusion includes a second angled surface extending between the distal surface of the second protrusion and an outermost tip of the second projection, each angled surface being configured to assist insertion into a gap between the first opposing end and the second opposing end of the friction ring received within an annular groove.

2. The plier tool of claim 1, wherein the first projection and the second projection extend radially outwardly beyond an outer surface of the first protrusion and the second protrusion, respectively, between about 0.10 millimeters and about 0.20 millimeters.

3. The plier tool of claim 1, wherein the first angled surface and the second angled surface each extend at an angle of between about 20 degrees and about 40 degrees relative to the central axis.

4. The plier tool of claim 1, wherein a distance defined between the distal surface of the first protrusion and the distal portion of the first arm, and a distance defined between a distal surface of the second protrusion and the distal portion of the second arm is between about 2 millimeters and about 3 millimeters.

5. The plier tool of claim 1, further comprising a biasing element extending between a proximal portion of the first arm and a proximal portion of the second arm, the biasing element configured to bias the proximal portion of the first arm away from the proximal portion of the second arm and the central axis.

6. The plier tool of claim 1, wherein a proximal portion of the first arm and a proximal portion of second arm are each received within and encompassed by a first handle and a second handle, respectively.

7. The plier tool of claim 6, wherein the first handle or the second handle defines a first bore extending at least partially therethrough, and a second bore extending co-axially within the first bore, wherein the first bore is configured to receive a friction ring therein and the second bore is configured to receive at least a portion of an anvil of an impact driver therein.

8. A method of replacing a friction ring of an impact driver using the friction ring plier of claim 1, the method comprising:

inserting the first angled surface of the first protrusion and the second angled surface of the second protrusion, respectively, into the gap defined by the first friction ring located within a groove of an anvil of the impact driver to concurrently engage opposing ends of the first friction ring and an inner surface of the first friction ring;

engaging the first pivotable arm and the second pivotable arm to expand the inner surface of the first friction ring beyond an outer surface of the anvil; and translating the friction ring plier proximally along the central axis to remove the first friction ring from the anvil of the impact driver.

9. The method of claim 8, further comprising:

engaging the first pivotable arm and the second pivotable arm to expand the inner surface of a second friction ring beyond an outer surface of the anvil; and translating the friction ring plier distally along the central axis to install the second friction ring onto the anvil of the impact driver.

10. The method of claim 8, further comprising inserting a second friction ring into a first bore defined in the first pivotable arm or the second pivotable arm such that the second friction ring contacts a first end of the first bore; and inserting the anvil of the impact driver into the first bore and a second bore defined coaxially with the first bore to install the second friction ring onto the anvil of the impact driver.

11. A plier tool for expanding a friction ring having a first opposing end and a second opposing end, comprising:

a first arm including a distal portion comprising a first protrusion extending distally from a central axis and a first projection extending outwardly from the first protrusion away from the central axis, the first projection configured to engage the first opposing end of the friction ring; and a second arm including a distal portion comprising a second protrusion extending distally from the central axis and a second projection extending outwardly from the second protrusion away from the central axis, the second projection configured to engage the second opposing end of the friction ring, the first or a second handle defining a first bore configured to receive the friction ring therein and a second bore configured to receive at least a portion of an anvil of an impact driver therein;

wherein the second arm is pivotably connected to the first arm to cause the distal portion of the first arm and the distal portion of the second arm to move away from each other and the central axis so as to expand a split ring for installation or removal, and wherein the first protrusion and the second protrusion each include a distal surface coplanar with each other, wherein the first protrusion includes a first angled surface extending between the distal surface of the first protrusion and an outermost tip of the first projection, and wherein the second protrusion includes a second angled surface extending between the distal surface of the second protrusion and an outermost tip of the second projection, each angled surface being configured to assist insertion into a gap between the first opposing end and the second opposing end of the friction ring received within a groove of the anvil.

12. The plier tool of claim 11, wherein the first projection is configured to engage an inner surface of the friction ring; and wherein the second projection is configured to engage an inner surface of the friction ring.

13. The plier tool of claim 12, wherein the first projection and the second projection extend radially outwardly beyond an outer surface of the first protrusion and the second protrusion, respectively, between about 0.10 millimeters and about 0.20 millimeters.

14. The plier tool of claim 12, wherein an outer surface of the first protrusion and the outer surface of the second protrusion each form a semi-ellipsoidal shape, such that the outer surface of the first protrusion and the outer surface of the second protrusion collectively form an ellipsoidal shape.

15. The plier tool of claim 11, wherein the first angled surface and the second angled surface each extend at an angle of between about 20 degrees and about 40 degrees relative to the central axis.

16. The plier tool of claim 11, wherein a distance defined between the distal surface of the first protrusion and the distal portion of the first arm, and a distance defined between the distal surface of the second protrusion and the distal portion of the second arm is between about 2 millimeters and about 3 millimeters.

17. The plier tool of claim 11, further comprising a biasing element extending between a proximal portion of the first arm and a proximal portion of the second arm, the biasing element configured to bias the proximal portion of the first arm away from the proximal portion of the second arm and the central axis.

18. The plier tool of claim 11, wherein the first bore includes a first end configured to limit translation of the friction ring within the first bore, and wherein the second bore includes a second end configured to limit translation of the anvil of the impact driver to align an annular groove configured to receive the friction ring therein with the first end of the first bore.

19. A method of replacing a friction ring of an impact driver using a friction ring plier, the method comprising:

inserting a first protrusion and a second protrusion extending from a first pivotable arm and a second pivotable arm, respectively, into a gap defined by a first friction ring located within a groove of an anvil of the impact driver to concurrently engage opposing ends of the first friction ring and an inner surface of the first friction ring, wherein the first protrusion and the second protrusion each include a distal surface coplanar with each other, wherein a first angled surface extends between a distal surface of the first protrusion and an outermost tip of a first projection, and wherein the second angled surface extends between a distal surface of the second protrusion and an outermost tip of a second projection, each angled surface being configured to assist insertion into a gap between the first opposing end and the second opposing end of the friction ring received within the groove of the anvil;

engaging the first pivotable arm and the second pivotable arm to expand the inner surface of the first friction ring beyond an outer surface of the anvil; and translating the friction ring plier proximally along a central axis to remove the first friction ring from the anvil of the impact driver.

20. The method of claim 19, further comprising:

engaging the first pivotable arm and the second pivotable arm to expand the inner surface of a second friction ring beyond an outer surface of the anvil; and translating the friction ring plier distally along the central axis to install the second friction ring onto the anvil of the impact driver.

21. The method of claim 19, further comprising inserting a second friction ring into a first bore defined in the first pivotable arm or the second pivotable arm such that the second friction ring contacts a first end of the first bore; and inserting the anvil of the impact driver into the first bore and a second bore defined coaxially with the first bore to install the second friction ring onto the anvil of the impact driver.

* * * * *